US010006985B2

(12) United States Patent
Dureau et al.

(10) Patent No.: US 10,006,985 B2
(45) Date of Patent: Jun. 26, 2018

(54) MOBILE DEVICE AND METHOD FOR DETERMINING A PLACE ACCORDING TO GEOLOCATION INFORMATION

(71) Applicant: SNIPS, Paris (FR)

(72) Inventors: Joseph Dureau, Clichy (FR); Colas Kerkhove, Paris (FR)

(73) Assignee: SNIPS, Paris (FR)

( * ) Notice: Subject to any disclaimer, the term of this patent is extended or adjusted under 35 U.S.C. 154(b) by 0 days. days.

(21) Appl. No.: 15/381,615

(22) Filed: Dec. 16, 2016

(65) Prior Publication Data
US 2017/0176568 A1    Jun. 22, 2017

(30) Foreign Application Priority Data

Dec. 16, 2015  (EP) ..................................... 15200364

(51) Int. Cl.
*G01S 5/02*      (2010.01)
*H04L 29/08*     (2006.01)
*H04W 4/02*      (2018.01)
*H04W 48/16*     (2009.01)
*H04W 4/04*      (2009.01)
(Continued)

(52) U.S. Cl.
CPC .......... *G01S 5/0252* (2013.01); *G01S 5/0278* (2013.01); *H04L 67/22* (2013.01); *H04W 4/02* (2013.01); *H04W 4/025* (2013.01); *H04W 4/028* (2013.01); *H04W 4/04* (2013.01); *H04W 48/16* (2013.01); *H04W 64/00* (2013.01); *G01C 21/20* (2013.01)

(58) Field of Classification Search
CPC ....... H04W 4/02; H04W 4/028; H04W 4/023; G06Q 30/02; G06Q 50/01; G06F 17/30867
See application file for complete search history.

(56) References Cited

U.S. PATENT DOCUMENTS 8,996,417 B1 * 3/2015 Channakeshava . G06Q 20/3224
                                                              705/26.9
9,277,483 B2 * 3/2016 Su .......................... H04W 48/04
(Continued)

OTHER PUBLICATIONS

Search Report and Written Opinion issued in European Application No. 15200364.6, dated May 20, 2016, in 7 pages.

*Primary Examiner* — Dung Hong
(74) *Attorney, Agent, or Firm* — Knobbe, Martens, Olson & Bear, LLP

(57) ABSTRACT

A mobile device and a method for determining a place according to geolocation information is disclosed. In one aspect, the method includes triggering an action in obtaining a first set of information related to the user, and, according to the current geographical location, a second set of places. The method may also include, for each place of the second set, determining a combined probability distribution that the user is currently located in said place, according to the first set of information, a first probability distributions based on a set of parameters related to global user habits, a second probability distributions based on a set of parameters related to user habits, and a third probability distributions based on a set of parameters related to local user habits. The method may further include triggering at least one action according to the combined probability distributions of the places of the second set.

13 Claims, 4 Drawing Sheets

(51) Int. Cl.
*H04W 64/00* (2009.01)
*G01C 21/20* (2006.01)

(56) References Cited

U.S. PATENT DOCUMENTS

| | | | | |
|---|---|---|---|---|
| 2009/0125585 | A1* | 5/2009 | Krishnaswamy | G06Q 30/02 709/203 |
| 2011/0125678 | A1* | 5/2011 | Partridge | G06Q 30/02 706/12 |
| 2011/0173130 | A1* | 7/2011 | Schaefer, IV | G06Q 30/02 705/347 |
| 2012/0136865 | A1* | 5/2012 | Blom | G06F 17/30141 707/739 |
| 2012/0191512 | A1* | 7/2012 | Wuoti | G06Q 30/0207 705/14.1 |
| 2012/0323876 | A1* | 12/2012 | Lymberopoulos | G06F 17/30867 707/706 |
| 2013/0006904 | A1* | 1/2013 | Horvitz | G06Q 10/10 706/46 |
| 2013/0226857 | A1* | 8/2013 | Shim | G06N 5/04 706/52 |
| 2013/0345957 | A1* | 12/2013 | Yang | G06N 5/02 701/300 |
| 2014/0128105 | A1* | 5/2014 | Su | H04W 4/021 455/456.3 |
| 2014/0187258 | A1 | 7/2014 | Khorashadi et al. | |
| 2015/0134451 | A1* | 5/2015 | Farrar | G06Q 30/0255 705/14.53 |
| 2015/0160015 | A1* | 6/2015 | DeWeese | H04W 4/043 701/526 |
| 2016/0048869 | A1* | 2/2016 | Shim | G06Q 30/0246 705/14.45 |
| 2016/0097646 | A1* | 4/2016 | Alonso | G06Q 30/02 701/408 |
| 2016/0100300 | A1* | 4/2016 | Van de Sompel | H04W 4/206 455/456.1 |
| 2016/0110774 | A1* | 4/2016 | Ahn | G06Q 30/08 705/15 |
| 2016/0300263 | A1* | 10/2016 | Priness | G06Q 30/0261 |
| 2016/0321551 | A1* | 11/2016 | Priness | G06N 5/047 |
| 2016/0360382 | A1* | 12/2016 | Gross | G06F 3/0488 |
| 2017/0031913 | A1* | 2/2017 | Favreau-Lessard | H04L 67/18 |
| 2017/0091812 | A1* | 3/2017 | Wong | G06Q 30/0253 |
| 2017/0134508 | A1* | 5/2017 | Kalis | H04L 67/18 |

\* cited by examiner

MOBILE DEVICE AND METHOD FOR DETERMINING A PLACE ACCORDING TO GEOLOCATION INFORMATION

CROSS-REFERENCE TO RELATED APPLICATION(S)

This patent application claims the benefit under 35 U.S.C. § 119 of European Application No. 15200364.6 filed on Dec. 16, 2015 which is hereby incorporated by reference in its entirety.

BACKGROUND

Technological Field

The described technology generally relates to means for determining a place according to geolocation information. More particularly, the described technology relates to means for determining a place where a user of a mobile terminal is currently located, according to current and past geolocation information.

Description of the Related Technology

Mobile devices such as mobile phones, tablets or wearable objects are provided with means for determining and storing data related to the geographical position of the user. For instance, geolocation data provided by positioning module can be determined and stored in logs, upon approval of the user. It is known to use such kind of current and past geolocation information to provide recommendations of nearby places for the user of the mobile device. For example, having obtained the current geographical position and according to past geolocation information, it is possible to recommend to the user restaurants or shops in the vicinity of the current geographical position. The recommendations may be established according to past-declared activities of the user.

SUMMARY OF CERTAIN INVENTIVE ASPECTS

However, the effectiveness and reliability of the recommendations depend to a large extent on the correct determination of the place where the user is currently located. In fact, determining the current geolocation of the user is not sufficient to identify the current place, since it may be affected by error of measurements and/or insufficient accuracy for distinguishing between a plurality of adjacent places. For example, for a given current geolocation, it may be difficult to determine if the user is in his office, or in the restaurant on the ground floor of the same building or in the metro station located just beneath the building. In this situation, recommendations for nearby places will be different whether the user is currently working, eating or waiting for the next train. However, it is very difficult to estimate the actual place where the user is currently located based on their current geolocation, on past geolocations. Moreover, known means for determining the place are not adapted to be used by services, provided in real time, in a mobile device with limited computing power capabilities.

It is therefore still desirable to provide means, adapted to be deployed on a mobile device with limited computational capabilities, for determining a place where a user of said mobile device is currently located, according to current and past geolocation information, and triggering actions accordingly.

To that end, according to a first aspect, the described technology relates to a method for triggering an action, according to a current geographical location of a mobile device of a user. The method comprises the following steps:

obtaining a first set of information related to the user;

obtaining, according to the current geographical location, a second set of places;

for each place of the second set, determining a combined probability distribution that the user is currently located in said place, according to the first set of information, a first probability distribution based on a set of parameters related to global user habits, a second probability distribution based on a set of parameters related to user habits, and a third probability distributions based on a set of parameters related to local user habits;

triggering at least one action according to the combined probability distribution.

In particular, the combined probability may be a combined posterior probability distribution that the user is currently located in said place. The combined posterior probability may be determined according to the first set of information, a first posterior probability distributions based on a set of parameters related to global user habits, a second posterior probability distributions based on a set of parameters related to user habits, and a third posterior probability.

For example, the global user habit parameters relate to information reflecting general habits of users, for example the popularity of places, typical times of arrival in each place category, typical duration of stay in each type of place, etc. The user habits parameters relate, for instance, to information reflecting the personal habits of the user of the mobile device, for example the kind of restaurants he is used to going, which day of the week he's going to the cinema, etc. For example, the local user habits relate to information reflecting the local habits of the user. In particular, the term "local" can relate to regions of approximately 500 meters radius in which characteristic behaviors have been observed. Typically, such a region can be determined around a user's workplace, around his home, etc. The local user habits may relate, for example, to the time he's usually go for lunch when he is at work, the grocery where he is used to go for shopping, the type of restaurant he goes to around his friends' places, etc.

Determining the combined probability distribution that the user is currently located in said place according to the first, second and third probability distributions allows improving the robustness of the method. The use of the first, second and third probability distributions respectively parameterized based on the complete user base habits, the user habits as well as the local user habits provides both robustness during user onboarding phase a well as high flexibility once the user has used the solution for a long time. More particularly, when the user starts using the mobile device and the availability of the user related information are limited, the first probability distributions based on the set of parameters related to global user habits can help providing reliable base for determining the probability distribution. From day one, the method is functional based on the habits on the complete user base, favoring popular places. The combined probability distribution for places of the second set will only stand out if they correspond to the typical habits and preferences of a global user base. As data on the user is accumulated, the method will start to improve and to discriminate places according to user habits, increasing the recall of the method. The use of a Bayesian approach allows to reflect the level of uncertainty remaining on the place estimation, mitigating the risk for false positives. As data accumulates, the method is able to identify specific user habits, e.g., vegetarianism, specific commute patterns, etc.

On the long term, finer results will be allowed by accounting for geographical patterns in user activities. An additional benefit of using the first, second and third probability distributions is to prevent from over fitting. Even on the long term, the method hedges against habitual activities performed in unusual places, be it in a different city or not. The method also hedges against unprecedented actions of the user. In the long term, the method is able to adapt to the different geographical patterns in the user habits: conventional restaurants close from family residences, wild nightlife in other neighborhoods, etc.

The first set of information related to the user may comprise one or a plurality of information related to at least one of the following non exhaustive list: a time of arrival at the current geographical position, a duration of the stay at the current geographical position, a name of the wireless network to which the mobile device is currently bound, a past habit or behavior of the user, a preference of the user, a declaration of activity.

The second set may comprise only places where the mobile device could be located at the present time and/or only places in the vicinity of the current geographical location of the mobile device.

In an embodiment, for each place of the second set, the combined probability distribution is determined proportionally to the product of a likelihood function and a prior function, the prior function of said place being determined according to information related to the popularity of said place, and/or a number of times the user has come to said place and/or to other similar places. For each place of the second set, the likelihood function of said place can be a function combining one or a plurality of the following terms:

a Gaussian distribution over a location observation process, an empirical distribution of arrival times in said place or in places similar to said place;

an exponential distribution with mean duration depending on said place or on a type of said place;

a minimum of the probability of a lexical distance or similarity between a name of a wireless network to which the mobile device is currently bound and a set of name candidates.

The steps of said method according to the first aspect may be executed each time the user remains in a place at least over a predefined amount of time. Consequently, the steps of said method according to the first aspect may be executed each time the user remains static long enough—at least over the predefined amount of time—within given radius for example.

The method may further comprise a learning step comprising:

obtaining a third set of information related to the user, the third set comprising information useful for identifying static stays of the user in places;

Identifying static stays of the user, according to the third set of information;

for each static stay previously identified, updating the set of parameters related to global user habits, the set of parameters related to user habits, and/or the set of parameters related to local user habits, according to information of the third set related to said static stay.

During the learning step, the set of parameters related to global user habits, the set of parameters related to user habits, and/or the set of parameters related to local user habits are typically identical or equivalent to the third set of information.

The learning step only requires re-processing of the information collected since the last time the step was executed, facilitating scalability. The computational cost of each execution of the learning step remains a linear function of the time spent since the last execution.

The learning step may further comprise:

identifying, using the third set of information a place corresponding to the home of the user adding to the second set the place corresponding to the home of the user.

The learning step may further comprise:

identifying, using the third set of information a place corresponding to the workplace of the user adding to the second set the place corresponding to the workplace of the user.

Determining the home and work places allow handling particular difficulties and needs. First, the user's home generally does not belong to the second set of places, in which public places are typically favored. It then needs to be handled separately. In addition, identifying the user's work place is useful to avoid being misled by unconventional patterns (e.g., spending the day in a metro station because that is where the user works).

The third set of information related to the user may be filtered so as to keep only information relevant for a specific period of time The learning step may be executed each time the user leaves one place of the second set of places.

The at least one action may comprise the sending of a request for action(s) to a system or a device configured to perform an action related to the combined probability distribution determined for each place of the second set.

The at least one action may comprise the sending to a third-party navigation system of a detected place where the user is currently located determined according to the combined probability distributions determined for each place of the second set.

The at least one action may comprise displaying on a user interface of the mobile device, supplementary information related to a detected place where the user is currently located determined according to the combined probability distributions determined for each place of the second set. For example, supplementary information may comprise explanations about the reason why the at least one action has been triggered.

According to an embodiment, it is determined if a detected place where the user is currently located, determined according to the combined probability distributions determined for each place of the second set, may be considered as usual or unusual. In the present description, the term "usual" refers to a place the user has already been repeatedly, typically at least three times. In the present description, by contrast, the term "unusual" refers to a place the user has not already done, or occasionally, typically one or twice at most. If the detected place is considered as usual, the at least one action may comprise:

determining or collecting information related to the detected place, and optionally displaying said information on the user interface of the mobile terminal;

If the detected place is considered as unusual, the at least one action may comprise:

looking for a local service related to the detected place.

According to a second aspect, the described technology also relates to a computer program that can be downloaded from a communication network and/or stored on a medium. This computer program comprises instructions for causing implementation of the method according to the second aspect, when said program is run by the processor.

According to a third aspect, the described technology also relates to information storage means, storing a computer program comprising a set of instructions causing implementation of the method according to the first aspect, when the stored information is read from said information storage means and run by a processor.

According to a fourth aspect, the described technology also concerns a mobile device configured to trigger an action, according to a current geographical location, said mobile device being adapted to be manipulated by a user. The mobile device is adapted to implement the method according to the first aspect. The mobile device comprises:

a user-data collector configured to obtain a first set of information related to the user;

a place directory configured to obtain, according to the current geographical location, a second set of places;

a data processor, coupled to the place directory and the user-data collector, and configured to determine, for each place of the second set, a fourth probability distribution that the user is currently located in said place, according to the first set of information, a first probability distributions based on a set of parameters related to global user habits, a second probability distribution based on a set of parameters related to user habits, and a third probability distributions based on a set of parameters related to local user habits;

an action trigger, coupled to the data processor, and configured to trigger at least one action according to the fourth probability distribution.

BRIEF DESCRIPTION OF THE DRAWINGS

The characteristics of the described technology will emerge more clearly from the following description of an example of an embodiment of the described technology, said description being made with reference to the accompanying drawings, among which.

DETAILED DESCRIPTION

Figure 1:
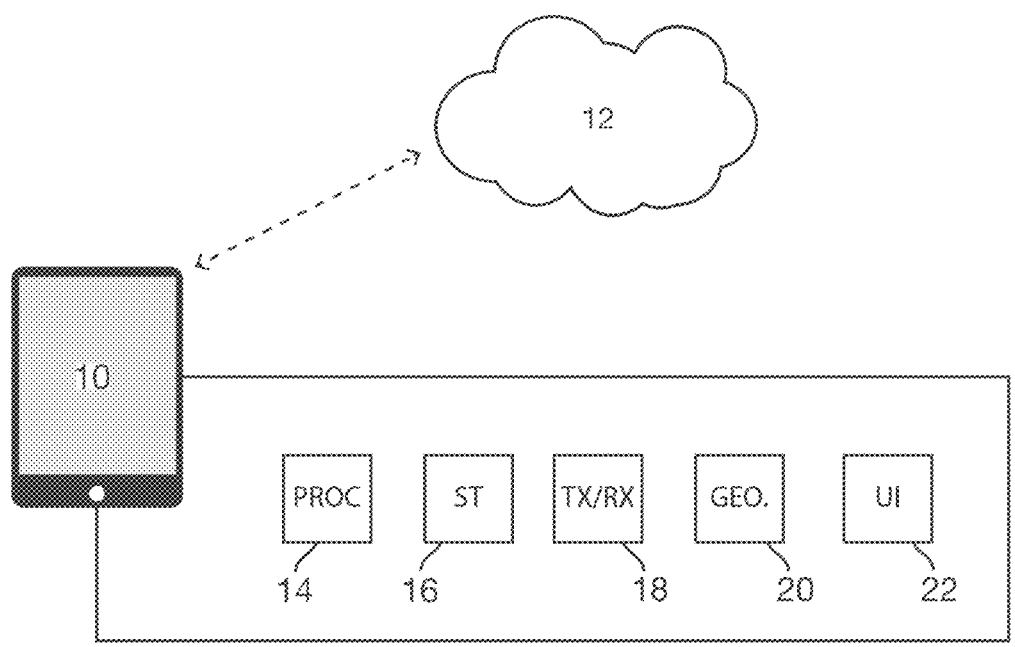
FIG. 1 schematically represents architecture of a mobile device adapted to implement the method according to the described technology.

FIG. 1 schematically represents a mobile device 10 in which a module according to the described technology may be implemented. The mobile device 10 is typically a telecommunication mobile device adapted to access wirelessly to a communication network 12. The mobile device 10 further comprises a processing module 14, for example a module provided with at least one Central Processing Unit and a Random-Access Memory. The mobile device 10 further comprises storage means 16, for example a Hard-Drive and/or a solid-state memory, for storing data and allowing the processing module 14 to read and/or write said data. The mobile device 10 includes at least one communication interface 18 adapted to allow wireless access to the communication network 20. In one embodiment, the communication network 20 is coupled to Internet. The mobile device 10 further comprises a geolocation module 20 coupled to the processing module and configured to allow the determination of the current geographical position of the mobile device 10 when turned on and/or activated. The geolocation module 20 may comprise means for determining the current geographical position using GPS, Galileo, beacons and/or WIFI means. The mobile device 10 further comprises a user-interface 22, provided for example with a touch-sensitive screen, sensors and an audio playback and recording interface. The processing module 14 is capable of executing instructions. The instructions form one computer program that causes the processing module 14 to perform some or all of the steps of the method described hereafter with regard to FIGS. 2, 3 and 4.

Any and all steps of the method described hereafter with regard to FIGS. 2, 3, 4 and 5, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Hereafter, in this description, the term activities relates to a list of activities performed and/or related to a user of the mobile device 10. According to the described technology, each activity may be classified according to a type of action. For example, a type of action can be one of the following non-exhaustive list: "working", "socializing", "eating". According to the described technology, each activity may also be classified according to a location and/or a time. A place is a delimited geographical area, for example the home of the user, the office of the user, a point of interest, such as a restaurant, a shop, a public transport station, a garden, etc.

Hereafter in the description, the following terms should be interpreted according to the common meanings in the context of Bayesian statistics, in particular:

a prior probability distribution, or prior, of an uncertain quantity is the probability distribution that would express one's beliefs about this quantity before some evidence is taken into account;

a likelihood function is a probability of observing what has been observed, conditioned on given values of the parameters of a statistical model;

the posterior probability of an event is the conditional probability that is assigned after the relevant evidence or background is taken into account.

Figure 2:
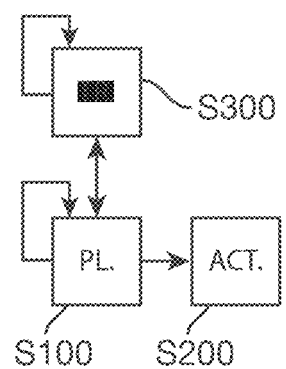
FIG. 2 schematically represents a method for triggering an action on the mobile device.

FIG. 2 schematically represents a method for triggering an action on the mobile device 10. The method comprises a place association step S100, an action step S200 and a learning step S300. The place association step S200 may be performed continuously, according to a schedule, upon detection of specific events and/or at specific periods, for example when the user launches a specific application or performs an action. The place association step S200 may be performed taking into consideration notably the amount of time over which the user has remained static. The learning step S300 may be performed according to a schedule, upon detection of specific events and/or at specific periods, for example each time the user leaves a place.

Advantageously, the place association step S100, the action step S200 and the learning step S300 can be executed locally on the mobile device 10. Consequently, the method according to the described technology does not require any user data management on a distant server. More particularly, the creation and the management of a user account—user profile, identification, credentials, etc.—on a distant server. Moreover, since the steps of the method are executed locally on the device that also collects and stores user-related information used by said method—such as geographical data related to the user, a security authorization granted by the user on its personal mobile device is typically sufficient to collect the required data method, without compromising privacy and security. Hence, personal data are not transmitted remotely by the method. Moreover, the steps of the method can be executed, even when no network connection is available at least based on a set of places that have been already visited since said set of places is stored locally.

Figure 8:
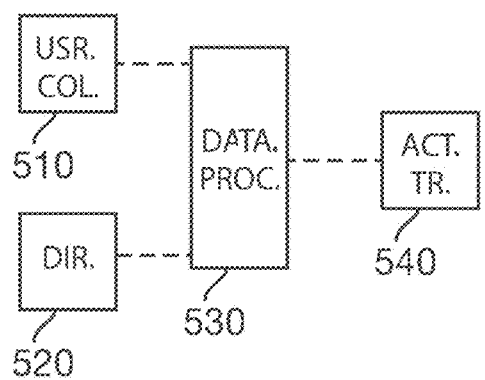
FIG. 8 schematically represents a mobile device according to an embodiment of the described technology.

FIG. 8 schematically represents a mobile device according to an embodiment of the described technology. The mobile device is configured to trigger an action, according to a current geographical location. The mobile device is adapted to be manipulated by a user. The mobile device comprises a user-data collector 510 configured to obtain a first set of information related to the user. The mobile device comprises a place directory 520 configured to obtain, according to the current geographical location, a second set of places. The mobile device comprises a data processor 530, coupled to the place directory 520 and the user-data collector 510, and configured to determine, for each place of the second set, a fourth posterior probability distribution that the user is currently located in said place, according to the first set of information, a first posterior probability distributions based on a set of parameters related to global user habits, a second posterior probability distributions based on a set of parameters related to user habits, and a third posterior probability distributions based on a set of parameters related to local user habits. The mobile device comprises an action trigger 540, coupled to the data processor 530, and configured to trigger at least one action according to the fourth posterior probability distribution.

Figure 4:
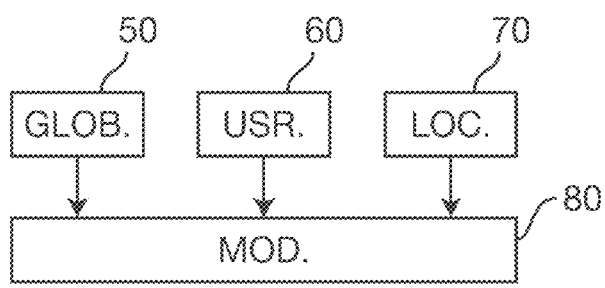
FIG. 4 schematically represents, in an embodiment, a model adapted to be used by the method for triggering an action on the mobile device.

During the place association step S100, a first set D of information related to the user is collected. The information may be gathered, by the mobile device 10, and may come from a plurality of sources, such as the geolocation module 20 or the sensors of the user interface 22. The information may come from any other user-related interactions with the mobile device 10. The first set D may comprise one or a plurality of information related to at least one of the following non exhaustive list: a current geographical position/location of the mobile device 10, a time of arrival at the current geographical position, a duration of the stay at the current geographical position, a name of the wireless network to which the mobile device is currently bound (for example the SSID—Service Set IDentifier»—of a Wi-Fi network), past habits/behavior of the user, preferences of the user, optional declaration of activity. As illustrated in FIG. 4, the place association step S100 is based on the use of a model 80 for determining a place according the first set D of information, and optionally on a set S of inferred information related to user preferences, habits of the user, and identification of user-specific places. In an embodiment, illustrated in the FIG. 4, the model 80 relies on the combination of three posterior probability distributions 50, 60, 70 determined for each place 〚pl〛_i of a set P of places. The first posterior probability distributions 50 is based on a set of parameters related to global user habits. The global user habit parameters relate to information reflecting general habits of users, for example the popularity of places, typical times of arrival in each place category, typical duration of stay in each type of place, etc. The second posterior probability distributions 60 is based on a set of parameters related to user habits. The user habits parameters relate to information reflecting the personal habits of the user of the mobile device, for example the kind of restaurants he is used to going, which day of the week he's going to the cinema, etc. The third posterior probability distributions 70 is based on a set of parameters related to local user habits. The local user habits relate to information reflecting the local habits of the user. In particular, the term "local" can relate to regions of approximately 500 meters radius in which characteristic behaviors have been observed. Typically, such a region can be determined around a user's workplace, around his home, etc. The local user habits may relate, for example, to the time he's usually go for lunch when he is at work, the grocery where he is used to go for shopping, the type of restaurant he goes to around his friends' places, etc. During the place association step S100, based on the analysis of the first set D of data, and optionally on the set S, a posterior probability distribution 〚 p(pl〛_i ly) that the user is currently located in the place 〚 pl〛_i is determined, using the model 80, for each place 〚 pl〛_i of the set P of places. A list L_post of said posterior probabilities distribution 〚 p(pl〛_i ly) is then built, by combining the posterior probabilities based on the global user habits parameters, the local user habits, and the local user habits.

Based on the list L_post, during the action step S200, one or more actions are triggered and executed by the mobile device 10 and optionally by other devices coupled to the mobile device 10 and accessible through the communication network 12, such as a remote server or a local connected object.

During the learning step S300, a set D' of information related to the user is collected. The information may be gathered, by the mobile device 10, and may come from a plurality of sources, such as the geolocation module 20 or the sensors of the user interface 22. The information may come from any other user-related interactions with the mobile device 10. The set D' may comprise one or a plurality of information related to at least one of the following non exhaustive list: a current geographical position/location of the mobile device 10, a time of arrival at the current geographical position, a duration of the stay at the current geographical position, a name of the wireless network to which the mobile device is currently bound (for example the SSID—Service Set IDentifier»—of a Wi-Fi network), past habits/behavior of the user, preferences of the user, optional declaration of activity. In an embodiment, the set D' and the first set D are identical or sensibly equivalent. During the learning step S300, the model 80 is updated according to the analysis of the set D' of data, and optionally on the set S. More particularly, the first posterior probability distributions 50, the second posterior probability distributions 60, and/or the third posterior probability distributions 70 are updated according to the analysis of the set D' of data, and optionally on the set S.

Figure 6:
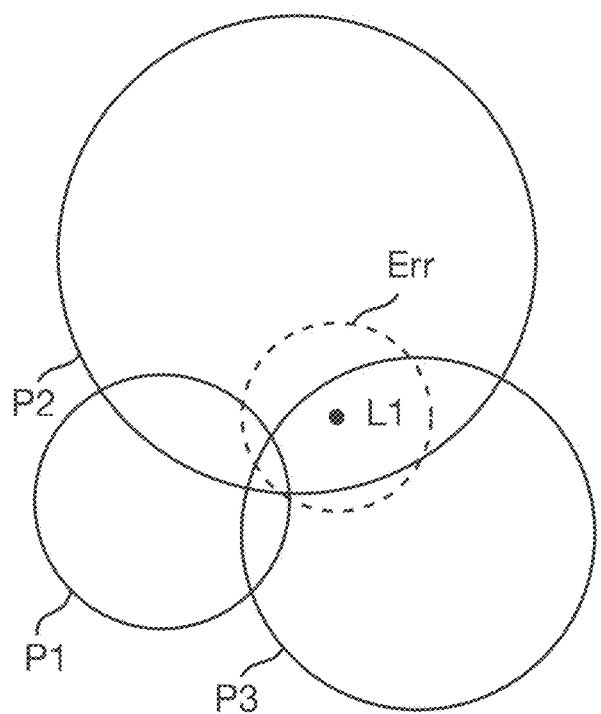
FIG. 6 illustrates an example of a current geographical configuration of the mobile device.

FIG. 6 illustrates an example of a current geographical configuration of the mobile device 10. In the example illustrated on FIG. 6, only three different places are represented in the geographical area where the mobile device is currently located. However, in typical real-life scenario, it is usual, notably in urban area, to have to discriminate between twenty different places or more in the same geographical area. In this example, the mobile device 10 is located in a geographical position $L_1$. The geographical position $L_1$ is for example obtained using the geolocation module 20. The measurements of geographical position $L_1$ are affected by errors, which are represented on the FIG. 6 by a circle Err, centered on the position $L_1$, having a radius equal to the level of uncertainties of the measurements. On the FIG. 6, three different places in the same geographical area as the position $L_1$ are represented by three circles: a first place $P_1$, a second place $P_2$ and a third place $P_3$. The first place $P_1$, a second place $P_2$ and a third place $P_3$ partially overlap. For example, the first place $P_1$ can be the office of the user, the second place $P_2$, can be a restaurant, and the third place $P_3$ can be a metro station located just beneath the restaurant. According to the position $L_1$, the mobile device 10 can be located either in the second place $P_2$ or in the third place $P_3$. Taking into consideration the errors affecting the measurements of geographical position $L_1$, the mobile device 10 can also be located in the first place $P_1$.

Figure 3:
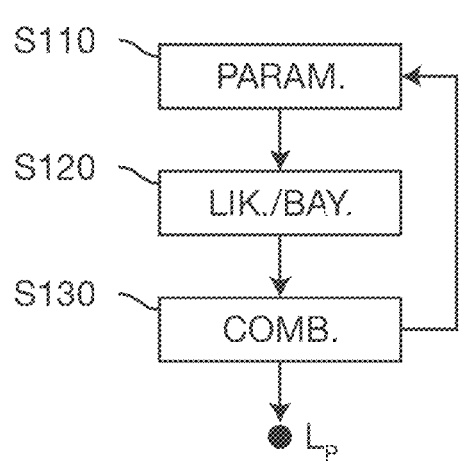
FIG. 3 schematically represents, in an embodiment, the detailed sub-steps of the place association step of the method for triggering an action on the mobile device.

Referring to FIG. 3, the detailed sub-steps of the place association step S100 are now discussed. During the place association step S100, based on the analysis of the first set D of data, and optionally on the set S, a posterior probability distribution $〚p(pl〛\_i\,ly)$ that the user is currently located in the place $〚pl〛\_i$ is determined, using the model 80, for each place $〚pl〛\_i$ of the set P of places or a sub-set of the set P—for example, only the places of the set P that are distant from the current geographical position of less than a threshold. A list L_post of said posterior probabilities distribution $〚p(pl〛\_i\,ly)$ is then built.

In a first sub-step S110, the first set D is collected. The first set D can be collected in real-time and/or read in a log, a database or any means adapted to store said data. The first set D of data further comprises information useful for determining static stays of the user in places $〚pl〛\_i$ of the set P. By "a static stay in a place $〚pl〛\_i$" it should be understood an event related to the stay of the user within the geographical limits of said place $〚pl〛\_i$ for at least a minimum period of time, for example for at least 5 minutes. The information used for determining static stays of the user in a place $〚pl〛\_i$ are geolocation information, for example a trails of geolocation. It is thus possible to determine, according to the first set D, periods, in which place $〚pl〛\_i$ the user has/had static stay(s). It may also be possible to determine arrival times in places of the set P where the user had/has a static stay, duration of the static stays, and/or names of the wireless network to which the mobile device had already been bound and/or are the most frequently bound.

In a second sub-step S120, for each candidate place $〚pl〛\_i$ of the set P, a posterior probability distribution of said place is determined. By candidate place $〚pl〛\_i$, it should be understood all places of the set P where the mobile device 10 could be located at the present time. For example, referring to FIG. 6, if the mobile device 10 is located in the geographical position L1, the candidate places $〚pl〛\_i$ are the first place P1, the second place P2 and the third place P3. For determining the places $〚pl〛\_i$ where the mobile device 10 could be at the present time, several information could be use, such distances between the current geographical position of the mobile device 10 and the set P of places, the name of the wireless network to which the mobile device is currently bound (for example the SSID—Service Set IDentifier»—of a Wi-Fi network), optional declarations of activity, etc. More particularly, the set of set of all candidate places can be obtained by determining the union of all the public places within a 70 m radius, and all the private places the user has declared to us prior to this association that fall within said 70 m radius. For each candidate place $〚pl〛\_i$, the posterior probability distribution of said place $〚pl〛\_i$ is proportional to the product of a likelihood function $〚p(pl〛\_i\,ly)$ and a prior.

In the second sub-step S120, the prior for each candidate place $〚pl〛\_i$ is determined according to information related to the popularity of said candidate place, and/or a number of times the user has come to said candidate place or to other similar places. Referring to the model 80, for each candidate place $〚pl〛\_i$, the prior probability of a place can be determined according to:

for the first posterior probability distribution 50 related to global user habits, an indicator of popularity, for example a number of check-ins in said candidate place, or a rating of the place following a given place rating dataset;

for the second posterior probability distribution 60 related to user habits, a number of times the user has visited a place of the corresponding category—shop, restaurant, bar, workplace, etc.—within the same local region of interest.

for the third posterior probability distribution 70 related to local user habits, a number of times the user has visited said candidate place in the past.

For each candidate place, the likelihood function is equal to the product of the following functions—up to a normalizing constant that does not need to be computed thanks to a renormalization of the totality of the terms:

a Gaussian distribution over the distance between the observed location of the user, and point locations of the places provided in a database of places, that can be determined according to the following mathematical expression:

$$p(〚pl〛\_i) = N(\mu=0,\sigma)$$

with $〚1〛\_USR$ the current geographical position of the mobile device 10;

$〚pl〛\_i$ the location of the place;

$\sigma$ a reference distance, typically 20 meters;

a histogram of arrival times in said place $〚pl〛\_i$ or in places similar to said place $〚pl〛\_i$;

an exponential distribution—as described for example in the online article http://en.wikipedia.org/wiki/Exponential_distribution as published on 29 Oct. 2015—parameterized with mean duration depending on the place or on the type of place—shop, restaurant, bar, workplace, etc.; referring to the model 80, the exponential distribution can be parameterized by using the following values:

for the first posterior probability distributions 50 related to global user habits, arbitrary average stay durations for each place category—shop, restaurant, bar, workplace, etc.;

for the second posterior probability distributions 60 related to user habits, the average stay duration of the user in the place.

for the third posterior probability distributions 70 related to local user habits, the average stay duration in places of the same category within the same region of interest;

When the user has never been in places of the same category within the corresponding region of interest, or if he has never been to that place, a reference mean duration of the global model can be used instead;

a function obtained by:

determining the name of the wireless network to which the mobile device is currently bound (Wi-Fi SSID for example);

obtaining a set of name candidates, said set comprising place names and a list of names of the wireless networks to which the mobile device was bound while being in said place;

for each name candidate of the set, computing a lexical distance—as described for example in the online article http://en.wikipedia.org/wiki/Levenshtein_distance as published on 29 Oct. 2015—or similarity between said name candidate and the name of the wireless network to which the mobile device is currently bound;

determining, for the set of name candidates, the minimum value of the lexical distance;

returning 1 if the minimum value of the lexical distance is below a given threshold—considering there has been a match, and 0 otherwise.

In the second sub-step S120, according to the previously determined likelihood function, for each candidate place ⟦pl⟧_i of the set P, posterior probabilities are determined:

according the global user habits parameters, reflecting general habits of users—what places are popular, what are the typical arrival times in each place category, and what are the typical stay durations in each type of place; and can be determined according to the following mathematical expression:

$$p\_global(y)=p\_global(⟦pl⟧\_i)\cdot p\_global(⟦pl⟧\_i))/$$
$$(\Sigma\_j p\_global(⟦pl⟧\_j)\cdot p\_global(⟦pl⟧\_j))$$

according the user habits parameters, reflecting the personal habits of the user—in what kind of restaurants he is used to going, on which day does he go to movies, etc.; and can be determined according to the following mathematical expression:

$$p\_user(y)=p\_user(⟦pl⟧\_i)\cdot p\_user(⟦pl⟧\_i))/$$
$$(\Sigma\_j p\_user(⟦pl⟧\_j)\cdot p\_user(⟦pl⟧\_j))$$

according the local user habits parameters, reflecting the local habits of the user—at what time does he go for lunch when he is at work, where does he go grocery shopping, the type of restaurant he goes to around his friends' place, etc.; and can be determined according to the following mathematical expression:

$$p\_(user\ local)(y)=(p\_(user\ local)(⟦pl⟧\_i)\cdot p\_(user\ local)(⟦pl⟧\_i))/(\Sigma\_j p\_(user\ local)(⟦pl⟧\_j)\cdot p\_(user\ local)(⟦pl⟧\_j))$$

In the third sub-step S130, the posterior probability distribution that the user is currently located in a place is determined, for each candidate place in the set P, and a corresponding list L_post of said posterior probabilities is built. For each place ⟦pl⟧_i, the posterior probability ⟦p(pl⟧_i ly) is determined by combining the posterior probability according the global user habits parameters, the posterior probability according the local user habits, and the posterior probability according the local user habits. For example, the posterior probability ⟦p(pl⟧_i ly) can be determined using the following mathematical expression:

$$p(y) \propto p\_global(y)+p\_user(y)+p\_(user\ local)(y)$$

Using the list L_post, during the action step S200, one or more actions are triggered and executed by the mobile device 10 and optionally by other devices coupled to the mobile device 10 and accessible through the communication network 12, such as a remote server or a local connected object. For example, the mobile device 10 can display and/or propose actions related to the place where the user is currently located. Based on the list L_post, the mobile device 10 may provide recommendations of nearby places for the user of the place. For example, based on the list L_post, the mobile device 10 can display the name and address of the place accessible to the user so that he can easily share his location with more precision and meaning than solely sharing his geolocation. For example, based on the list L_post, the mobile device 10 can provide easy access to credit card/paypal payment if available. In another example, based on the list L_post, the mobile device 10 can provide tips and reviews corresponding the where the user is, and/or give him access to corresponding applications or services (e.g. loyalty card). Based on the list L_post, the mobile device 10 can also facilitate the access to applications that are relevant in this setting: for example music, games and reading at home, email and productivity apps at work.

Figure 5:
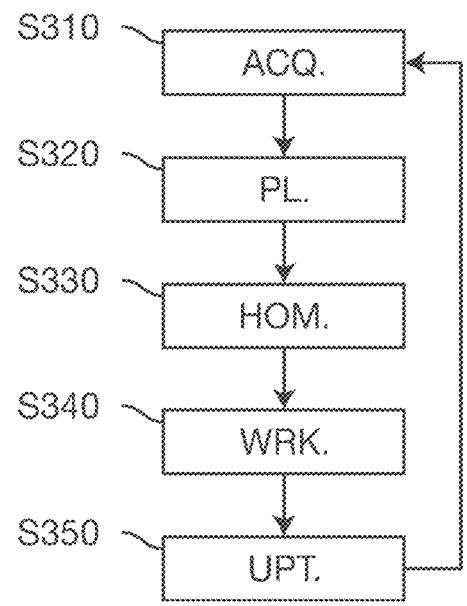
FIG. 5 schematically represents, in an embodiment, the detailed sub-steps of the learning step of the method for triggering an action on the mobile device.

Referring to FIG. 5, the detailed sub-steps of the learning step S300 are now discussed.

In a first sub-step S310, the set D' is collected. The set D' can be collected in real-time and/or read in a log, a database or any means adapted to store said data. The set D' can be collected in real-time and/or read in a log, a database or any means adapted to store said data. The set D' further comprises information useful for determining static stays of the user in places ⟦pl⟧_i of the set P. The information useful for determining static stays of the user in a place ⟦pl⟧_i may be one or a plurality of information of the following non-exhaustive list: a past and/or current geographical position of the mobile device 10, a past and/or current position of the mobile device 10, a time of arrival at the past and/or current geographical position, a time of arrival at the past and/or current place, a duration of the stay at the past and/or current geographical position, a duration of the stay at the past and/or current place, a name of the wireless network to which the mobile device is currently/was bound, past and/or current measures of accelerations. It is thus possible to determine, according to the set D', periods, in which place ⟦pl⟧_i the user has/had static stay(s). It may also be possible to determine arrival times in places of the set P where the user had/has a static stay, duration of the static stays, and/or names of the wireless network to which the mobile device had already been bound and/or are the most frequently bound. In an embodiment, the set D' is filtered so as to keep only information relevant for a specific period of time. The specific period of time may relate to a recent period, for example, only the last day or the last week. In a second sub-step S320, static stays of the user are identified according to the information of the set D', based on the analysis of the set D', and optionally on the set S of inferred information related to user preferences, habits of the user, and identification of user-specific places. In a third sub-step S330, a place corresponding to the home of the user is identified, based on the analysis of the set D', and optionally on the set S. For example, the home place is determined by identifying the place in which the user has spent most time over a given period of the days, typically night hours during workweek, and anytime on weekends. The user's home can then be added to the set P and identified as home place, or updated accordingly. For example, if within a 70 m radius, the home is added to the list of relevant places among which the association is made. This is advantageous, since in general, the user's home isn't public, hence not available in public places databases. It allows adding it to the set P so that the user can be associated to it. In a fourth sub-step S340, a place corresponding to the work place of the user is identified, based on the analysis of the set D', and optionally on the set S. For example, the work place is determined by identifying the place in which the user have spent most time over a given period of the days, for example working hours of the week. The user's workplace can then be added to the set P and identified as workplace, or updated accordingly. If the user's workplace is not a public place, it allows adding it to the set P, so that the user can be associated to it. In a fourth sub-step S350, for each static stay identified during the second sub-step S320, information related to said static stay are used to update the parameters of the first, second and/or third posterior probability distributions 50, 60, 70 of the model 80. For example, for each static stay, it is possible to identify the time period spent by the user in the corresponding location, either doing an unknown activity if it cannot be determined or obtained, or doing an activity corresponding to the estimated place (eating sushi in a sushi bar, drinking in a bar, etc.), and update the model 80 accordingly.

Figure 7:
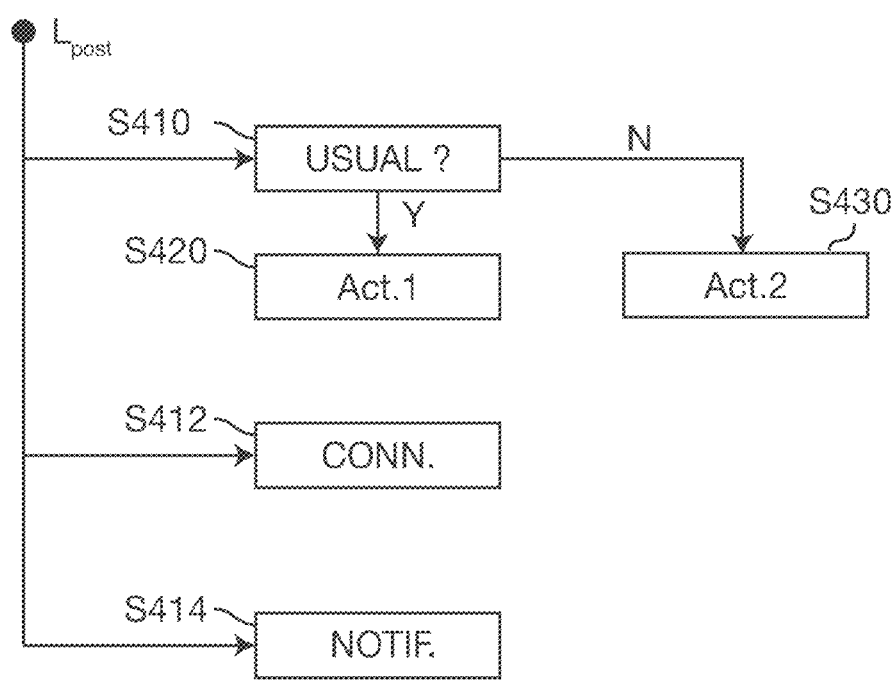
FIG. 7, schematically represents, in an embodiment, the detailed steps of the action step according to an embodiment.

Referring to FIG. 7, the detailed steps of the action step S200 according to an embodiment are now discussed.

In a step S410, according to the list L_post, a detected place where the user is currently located, is determined, and if the detected place may be considered as usual or unusual. In the present description, the term "usual" refers to a place the user has already been repeatedly, typically at least three times. In the present description, by contrast, the term "unusual" refers to a place the user has not already been, or occasionally, typically one or twice at most.

If the detected place is considered as usual, in a step S420, at least one action related to said detected place is triggered. A non-exhaustive list of possible actions that can be executed during the step S420 is described hereafter. It should be understood that, during the step S420, only one action of the following non-exhaustive list or a combination of at least two actions of the non-exhaustive following list may be executed. If a plurality of actions are executed, it should also be understood that the actions could be executed in parallel, sequentially, or in a predetermined or computed order.

During the step S420, an estimated time to reach a place of destination Pdest may be determined. The estimated time to reach the place Pdest may be determined according to information collected during previous similar journeys, for example a mean of the actual duration of previous journeys from the detected place to the place Pdest for doing at least one activity and/or at a sensibly same time period of the day/week.

During the step S420, information related to the detected place may be determined and/or collected, and displayed on the user interface of the mobile terminal. For example, meteorological information related the detected place may be collected. Accordingly, for example, the user may be notified on the mobile terminal that it will be raining at the detected place, or that the museum is closed. Suggestions, hints or actions could be subsequently be proposed or triggered. For instance, the mobile phone may propose another cultural space opened in the vicinity of the detected place or suggest to take the public transport instead of walking when rain has been forecasted.

During the step S420, information related to transport means that the user is supposed to use to go from the detected place to the place Pdest may be determined and/or collected, and displayed on the user interface of the mobile terminal. For example, if the user is going from the detected place to the place Pdest and it has been observed that for doing similar journeys he's using its car, information related to the position the car, and/or duration for the user to reach his car may be determined and displayed.

If the detected place is considered as unusual, in a step S430, at least one action related to said detected place is triggered. A non-exhaustive list of possible actions that can be executed during the step S430 is described hereafter. It should be understood that, during the step S430, only one action of the following non-exhaustive list or a combination of at least two actions of the non-exhaustive following list may be executed. If a plurality of actions are executed, it should also be understood that the actions could be executed in parallel, sequentially, or in a predetermined or computed order.

During the step S430, the mobile terminal may look for a local service related to the detected place. For example, the mobile terminal may send, to a booking service, a request to list available rooms in hotels surrounding the detected place.

During a step 412, according to the list L_post, the mobile terminal send a request for action(s) to a system or a device configured to perform an action related to the detected place. For example, if according to the list L_post it is possible to determine that the user is in a room, the mobile terminal may try to connect to a device of said room, for instance an air conditioner system, the request for action(s) comprising an instruction to switch on the heating so as a desired temperature is reached before the arriving of the user. In another example, if according to the list L_post it is possible to determine that the user is not in a given room, the mobile terminal may try to connect to a device of said given room, for instance an air conditioner system or a light-management system, the request for action(s) comprising an instruction to switch to an energy-saving mode on the air conditioner system or the light-management system, so as to diminish the energy consumption.

During the step S412, if a third-party navigation system is accessible to the mobile terminal, the latter may try to couple with the third-party navigation system, so as to transmit the detected place to the third-party navigation system. For instance, if the user is located in a vehicle or in its vicinity, the mobile terminal may establish a communication channel with the navigation system of said vehicle, and send the detected place to the navigation system of said vehicle.

During a step S414, supplementary information related to the list L_post, the at least one action triggered during the action step S200, may be displayed on the user interface of the mobile device. For example, supplementary information may comprise explanations about the reason why the action has been triggered, or why a meteorological information of the detected place has been displayed.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for triggering an action according to a current geographical location of a mobile device, the method comprising:

obtaining a first set of information related to a user of the mobile device;

obtaining, according to the current geographical location, a second set of places;

for each place of the second set, determining a combined probability distribution that the mobile device is currently located in said place according to: (i) the first set of information, (ii) a first probability distribution based on a set of parameters related to global user habits, (iii) a second probability distribution based on a set of parameters related to user habits, and (iv) a third probability distribution based on a set of parameters related to local user habits; and triggering at least one action according to the combined probability distribution.

2. The method according to claim 1, wherein the second set comprises only places where the mobile device could be located at the present time and/or only places in the vicinity of the current geographical location of the mobile device.

3. The method according to claim 1, wherein the first set of information related to the user comprises one or a plurality of information related to at least one of the following list: a time of arrival at the current geographical position, a duration of the stay at the current geographical position, a name of the wireless network to which the mobile device is currently bound, a past habit or behavior of the user, a preference of the user, a declaration of activity.

4. The method according to claim 1, wherein, for each place of the second set, the combined probability distribution is determined proportionally to the product of a likelihood function and a prior function, the prior function of said place being determined according to information related to the popularity of said place, and/or a number of times the user has come to said place and/or to other similar places.

5. The according to claim 4, wherein, for each place of the second set, the likelihood function of said place is a function combining one or a plurality of the following terms:

a Gaussian distribution over a location observation process;

an empirical distribution of arrival times in said place or in places similar to said place;

an exponential distribution with mean duration depending on said place or on a type of said place; and a minimum of the probability of a lexical distance or similarity between a name of a wireless network to which the mobile device is currently bound and a set of name candidates.

6. The method according to claim 1, wherein the steps of said method are executed each time the user remains in a place at least over a predefined amount of time.

7. The method according to claim 1, further comprising a learning step comprising:

obtaining a third set of information related to the user, the third set comprising information useful for identifying static stays of the user in the places of the second set of places;

identifying static stays of the user, according to the third set of information for each static stay previously identified; and updating the set of parameters related to global user habits, the set of parameters related to user habits, and/or the set of parameters related to local user habits, according to information of the third set related to said static stay.

8. The method according to claim 7, wherein the learning step further comprises:

identifying, using the third set of information a place corresponding to the home of the user; and adding to the second set the place corresponding to the home of the user.

9. The method according to claim 7, wherein the learning step further comprises:

identifying, using the third set of information a place corresponding to the workplace of the user; and adding to the second set the place corresponding to the workplace of the user.

10. The method according to claim 7, wherein the third set of information related to the user is filtered so as to keep only information relevant for a specific period of time.

11. The method according to claim 7, wherein the learning step is executed each time the user leaves one place of the second set of places.

12. A non-transitory computer readable medium having a set of instructions stored thereon which, when executed, cause the implementation of the method according to claim 1.

13. A mobile device configured to trigger an action, according to a current geographical location, said mobile device being adapted to be manipulated by a user and comprising:

a user-data collector configured to obtain a first set of information related to the user;

a place directory configured to obtain, according to the current geographical location, a second set of places;

a data processor, coupled to the user-data collector and the place directory, and configured to determine, for each place of the second set, a combined probability distribution that the mobile device is currently located in said place according to: (i) the first set of information, (ii) a first probability distribution based on a set of parameters related to global user habits, (iii) a second probability distribution based on a set of parameters related to user habits, and (iv) a third probability distribution based on a set of parameters related to local user habits; and an action trigger, coupled to the data processor, and configured to trigger at least one action according to the combined probability distributions of the places of the second set.

* * * * *